Aug. 18, 1942.        J. E. SNYDER        2,293,568
PROCESS FOR LAMINATING RUBBER HYDROCHLORIDE TO PAPER
Filed June 22, 1940

Inventor
James E. Snyder

By

Attorney

Patented Aug. 18, 1942

2,293,568

UNITED STATES PATENT OFFICE 2,293,568

PROCESS FOR LAMINATING RUBBER HYDROCHLORIDE TO PAPER

James E. Snyder, Akron, Ohio, assignor to Wingfoot Corporation, Wilmington, Del., a corporation of Delaware Application June 22, 1940, Serial No. 341,877

1 Claim. (Cl. 154—2)

This invention relates to the lamination of a film of heat-sealable material.

According to this invention lamination with a film of heat-sealable material is carried out by heating the under surface of the film which is to be united to the other material and so regulating the temperature that the heat-seal is effected without raising the outer surface of the heat-sealable film to a temperature at which it becomes tacky. The lamination may be made with a wide sheet or film, or it may be merely the lamination of one overlapping piece of film to another such as in the closing of a package.

The heat-sealing of rubber hydrochloride film such as the Pliofilm rubber hydrochloride sheet material now on the market is common practice. The invention will therefore be described in connection with the lamination of rubber hydrochloride film, although other heat-sealable materials may be similarly employed, including cellulose esters, vinyl derivatives, etc., plasticized as desired or necessary.

Figure 2:
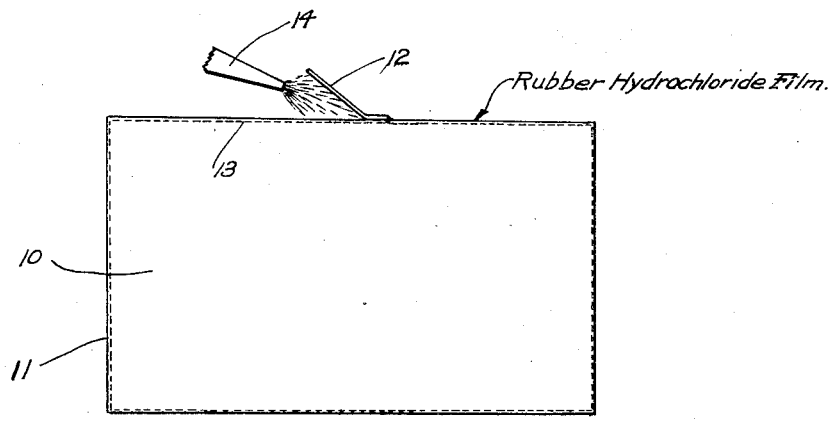
Figure 1:
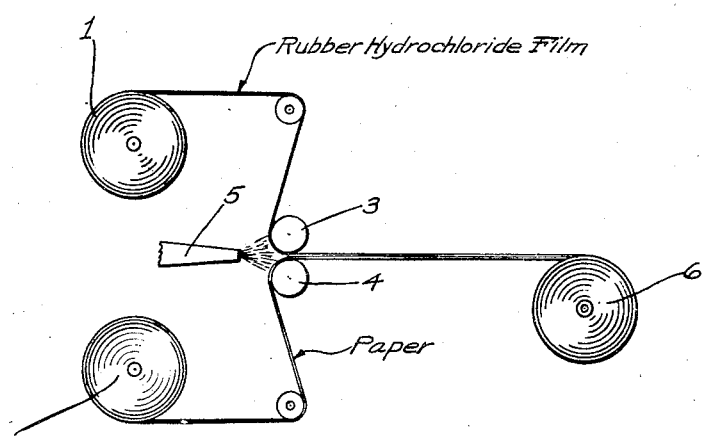

The invention will be further described in connection with the accompanying drawings in which Fig. 1 shows a method of laminating the heat-sealable material to paper or the like and Fig. 2 shows lamination in the sealing of a package. In the drawing the reference numeral 1 indicates a roll of rubber hydrochloride film which is to be united to paper. The reference numeral 2 indicates the roll of paper. The rubber hydrochloride film may be a film about .001 of an inch thick or it may be thicker or thinner film. The two plies are brought from the rolls 1 and 2 between the pressure rolls 3 and 4 where they are united. The blast of hot air from the nozzle 5 heats the surfaces which are to be united. The under surface of the film is heated to the temperature required to make it tacky and heat-sealable. This temperature will vary depending upon whether the film is plasticized or not, but the temperature to which the under surface of the film is heated will ordinarily be in the neighborhood of 110° C. With thicker film, a somewhat higher temperature may be used than with thinner film without heating the outer surface of film to the temperature at which it becomes tacky. In some instances it may be desirable to direct the blast of hot air more toward the paper than the film. The blast of air may be directed chiefly against the paper so that it is only slightly reflected against the film depending upon the temperature of the air and the rate at which the film and paper are traveling. In this way the inner surfaces of the paper and the film which are to be united are heated to the temperature required for lamination but without excessively heating the outer surfaces.

One may heat only the inner surface of the paper by directing the blast of air solely on the paper just prior to its being brought into contact with the film. The temperature to which the paper must be heated in this case is higher than where the film is heated also. Such a process is most satisfactory where thin film is employed.

The pressure applied between the rolls 3 and 4 forms a firm union between the film and paper. The laminated sheet is eventually rolled on the windup roll 6. It may be desirable to provide a festoon or like cooling means between the pressure rolls 3 and 4 and the windup roll 6 to allow the laminated sheet to cool before being wound up.

Fig. 2 shows an article 10 wrapped in rubber hydrochloride film 11. The film is overlapped at the top of the package and the seal is formed by heat with light pressure. The upper lap of film 12 is to be united to the portion 13 which lies flat on the top of the article. To produce this union according to this invention, the under surface of the flap of film 12 is heated to a temperature sufficient to make a firm union with the film 13 and without heating the exposed surface of the film 12 to a temperature at which it becomes tacky. The heat is supplied by hot air blown through the nozzle 14. After heating the flap of film 12 is pressed to the film 13 with sufficient pressure to form a tight union. The temperature of the air employed and the time of blowing are so regulated that with film of the thickness employed the under surface of the film is heated to the temperature at which it becomes tacky, but the outer surface of the flap 12 is never raised to this temperature during the sealing operation.

Any suitable means of heating may be used instead of the hot air blast. For example, a small gas flame, a source of radiant heat, heated metal rollers or heated platens may be employed.

An alternative method is to direct a separate source of heat against each of the surfaces to be united. For example, in fabricating tubes or bags one heated roller may be used to heat the inner surface of one film and another roller may be used to heat the inner surface of the other film and finally the two heated surfaces would be pressed together.

Although ordinarily transparent film will be used in carrying out the invention, pigmented or dyed material may be employed equally well.

Although the illustrations are limited to the union of film with itself and with paper, the invention is applicable broadly to the union of film with other material such as cloth and other materials including rigid objects as well as flexible backing materials.

This method is especially suited to the lamination of rubber hydrochloride, to cardboard or other thick fabric where the customary method of heating through the fabric would require a temperature so high as to scorch the outer surface of the fabric. Likewise, in producing thick laminations of rubber hydrochloride to rubber hydrochloride (0.01 inch thick and thicker) the method is especially advantageous because it prevents injury to and melting of the outer surfaces of the film which would result from applying heat from the outside. It is equally advantageous for uniting plies of any heat-sealable material which are 0.01 inch thick or thicker.

I claim:

The continuous process of sealing rubber hydrochloride film approximately .001 inch thick to paper by heat and pressure which comprises directing the heat against the surfaces of the film and paper which are to be united to make the heated surface of the film tacky and to heat the paper, and uniting the film and paper by pressure without heating the opposite surface of the film to the temperature at which it becomes tacky.

JAMES E. SNYDER.